(12) United States Patent
Degelsegger

(10) Patent No.: US 9,109,737 B2
(45) Date of Patent: Aug. 18, 2015

(54) DEVICE FOR SEALING THE END FACE OF A TUBE FROM WHICH FLUID FLOWS

(76) Inventor: Walter Degelsegger, Desselbrunn (AT)

( * ) Notice: Subject to any disclaimer, the term of this patent is extended or adjusted under 35 U.S.C. 154(b) by 191 days.

(21) Appl. No.: 13/703,022

(22) PCT Filed: Jun. 22, 2011

(86) PCT No.: PCT/AT2011/000274
§ 371 (c)(1),
(2), (4) Date: Dec. 9, 2012

(87) PCT Pub. No.: WO2011/160150
PCT Pub. Date: Dec. 29, 2011

(65) Prior Publication Data
US 2013/0074969 A1 Mar. 28, 2013

(30) Foreign Application Priority Data
Jun. 25, 2010 (AT) ................ A 1077/2010

(51) Int. Cl.
*F16L 55/128* (2006.01)
*F16L 55/10* (2006.01)
*E21B 33/127* (2006.01)
*E21B 33/136* (2006.01)
*F16L 55/134* (2006.01)

(52) U.S. Cl.
CPC .......... *F16L 55/1018* (2013.01); *E21B 33/127* (2013.01); *E21B 33/136* (2013.01); *F16L 55/128* (2013.01); *F16L 55/134* (2013.01)

(58) Field of Classification Search
USPC ............... 285/109, 97, 102, 375, 104, 95, 98, 285/107, 338; 166/120, 134, 124, 202, 187, 166/177.3
See application file for complete search history.

(56) References Cited

U.S. PATENT DOCUMENTS

| 2,649,710 | A | * | 8/1953 | Dale .............................. 166/202 |
| 3,623,550 | A | * | 11/1971 | de Lajarte et al. ............ 166/202 |
| 4,423,783 | A | * | 1/1984 | Haag .............................. 166/120 |
| 4,984,641 | A | * | 1/1991 | Pryor .............................. 285/98 |
| 6,561,269 | B1 | * | 5/2003 | Brown et al. ................. 166/187 |
| 6,769,321 | B1 | | 8/2004 | Appleton et al. |
| 7,316,430 | B2 | * | 1/2008 | Biester .......................... 166/338 |
| 2006/0064829 | A1 | | 3/2006 | Houldey et al. |
| 2007/0214590 | A1 | | 9/2007 | Boe |

FOREIGN PATENT DOCUMENTS

| EP | 0 955 103 A1 | 11/1999 |
| GB | 2432600 A | 5/2007 |
| WO | WO 2008/111843 A1 | 9/2008 |

OTHER PUBLICATIONS

International Search Report, Aug. 31, 2012, from International Phase of the instant application.

\* cited by examiner

*Primary Examiner* — David E Bochna
(74) *Attorney, Agent, or Firm* — Jackson Patent Law Office

(57) ABSTRACT

A device, for sealing the end face of a tube, includes an inner tube which has a smaller diameter than the tube to be sealed and is introduced at the end face into the tube to be sealed; a sealing body which is provided to seal a ring gap between the inner tube and the tube to be sealed, the sealing body being arranged in a movable manner on the inner tube; a turbine configured to be driven by a fluid flow from the tube; and a mechanical transmission. The mechanical transmission is connected between the turbine and the sealing body, and acts to translate rotational movement of the turbine from the fluid flow into a movement of the sealing body, thereby bringing the sealing body from a position having reduced sealing capacity into a position having higher sealing capacity.

16 Claims, 2 Drawing Sheets

DEVICE FOR SEALING THE END FACE OF A TUBE FROM WHICH FLUID FLOWS

CROSS-REFERENCE TO RELATED APPLICATIONS

This application is U.S. National Stage Entry of International Application PCT/AT2011/000274, which claims priority benefits of Austrian Application 1077/2010 filed 25 Jun. 2010.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC

Not Applicable.

BACKGROUND OF THE INVENTION

The inventor has set himself the task of allowing the sealing of a tube which protrudes from the borehole of an oil well and from which raw oil flows under high pressure and under a significant flow per time.

BRIEF SUMMARY OF THE INVENTION

In order to solve the task a device according to the combination of the following characteristics is proposed:
- At the end face of the tube to be sealed, a thinner, "inner tube" is introduced, through which fluid can be drained. The outer diameter of the inner tube is smaller than the inner diameter of the outer tube to be sealed.
- At the end face of the inner tube, a turbine is arranged, which is driven by the flowing fluid, wherein the movement of said turbine is translated into a movement of one or more sealing bodies.
- Through said movement of the sealing bodies, these sealing bodies are brought from a position having reduced or no sealing capacity into a position sealing the ring gap between the two tubes or at least constraining flow in the ring gap to an extent so that it is easily possible to arrange a permanent, fully scaling seal behind these sealing bodies.

BRIEF DESCRIPTION OF THE DRAWING

The invention is illustrated by means of an embodiment.

DETAILED DESCRIPTION OF THE INVENTION IN THE SPECIFICATION

Figure 1:
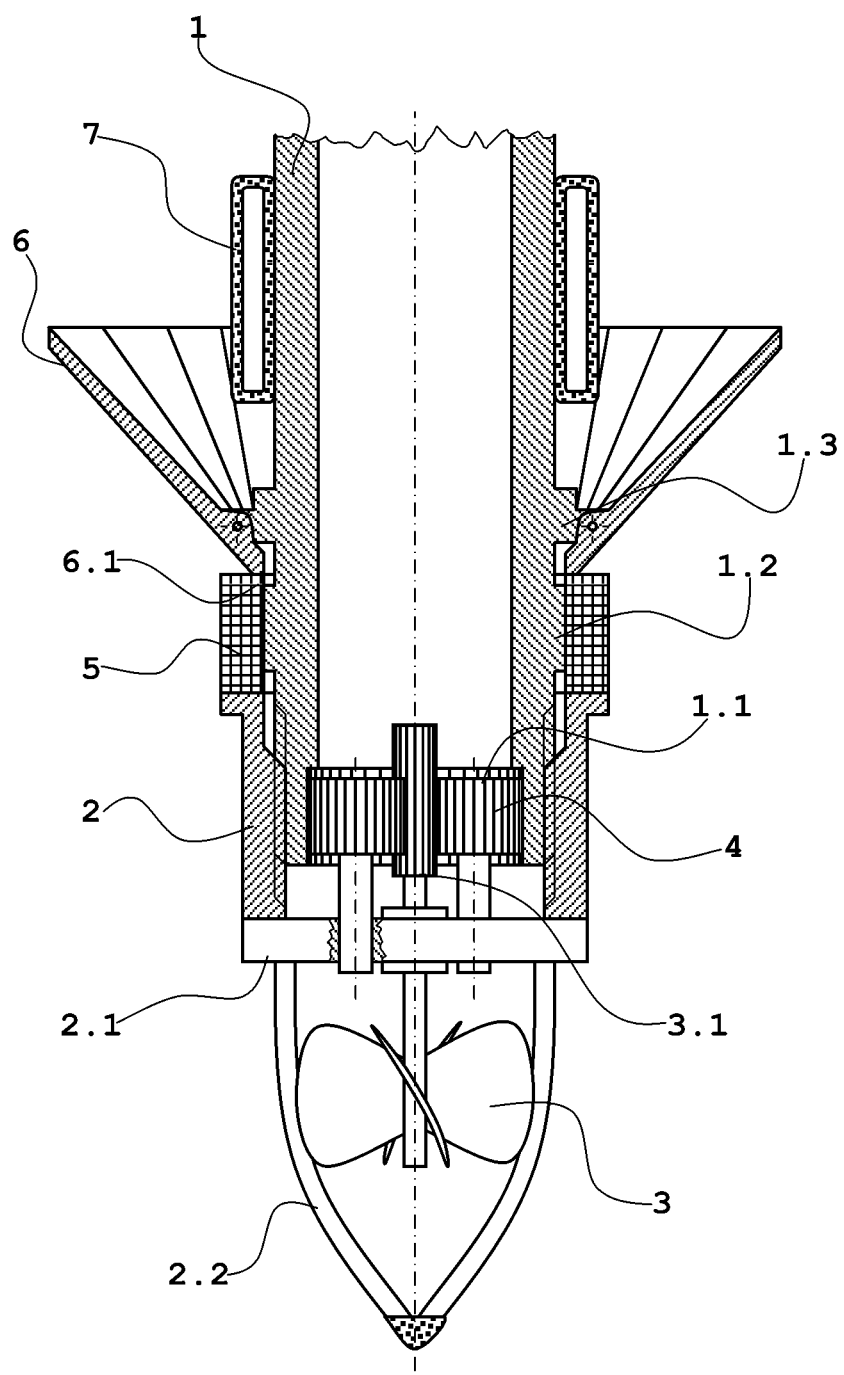
FIG. 1: shows a first exemplary device according to the invention in a vertical partial sectional view.

In the orientation according to FIG. 1, the tube to be sealed not shown would be directed upwards and the device according to the invention would have to be introduced vertically downwards into said tube to be sealed and fluid would flow from the tube to be sealed, namely from bottom to top.

The device according to the invention according to FIG. 1 comprises a tube 1, in the following referred to as "inner tube".

At its end to be introduced into the tube to be sealed, the inner tube 1 is provided with a screw thread to which a ring-shaped nut part 2 is mounted and thus threadedly engaged.

At its end face protruding over the end face of the inner tube 1, the nut part 2 is spanned by a strut 2.1. From the end face of the nut part 2, an approximately conical protective cage essentially formed by three or four longitudinal struts 2.2 protrudes in the direction in which the inner tube 1 has to be introduced into the outer tube.

Protected by the cage, a turbine 3 is arranged, the rotary axis of which is aligned with the axis of the inner tube 1 and the rotor of which is mounted to the strut part 2.1 so as to be rotatable.

A gear wheel 3.1 is arranged coaxially connected to the rotor of the turbine forming the sun wheel of a planetary gear. Two planet wheels 4 engaging with said sun wheel are mounted to the strut 2.1 rigidly connected to the nut part 2. The stationary internal gear of the planetary gear with which the planet wheels 4 also engage is formed by an internal gearing 1.1 at the inner shell of the inner tube 1 in its longitudinal area adjacent to the end face.

The flowing fluid drives the rotor of the turbine 3. The transmission of the planetary gear translates the rotational movement of the rotor into a significantly slower rotational movement of the nut part 2 causing said nut part, due to its thread engagement, to be slid further onto the tube 1 so that it moves an axially displaceably guided spacer ring 5 so that said spacer ring presses against blade-like sealing bodies 6, which are pivotably mounted to the inner tube 1 and spread radially away from the inner tube 1 by this pressure.

According to the intended purpose, the radially outer ends of the sealing bodies 6 contact the inner shell of the tube to be sealed (not shown) thus preventing or constraining flow in the ring gap between the two tubes. Now, one or more inflatable sealing bodies 7, which are concentrically arranged around the shell of the inner tube, can be inflated and improve the sealing capacity. Between said axially spaced sealing bodies 7, internal fluid can be extracted and a hardening, permanently solidifying sealing compound can be injected and left to solidify.

The inner tube can be provided with a shut-off device in a rear longitudinal area, which can be used to completely shut off the fluid flow after completion of sealing in the ring gap between the two tubes.

Figure 2:
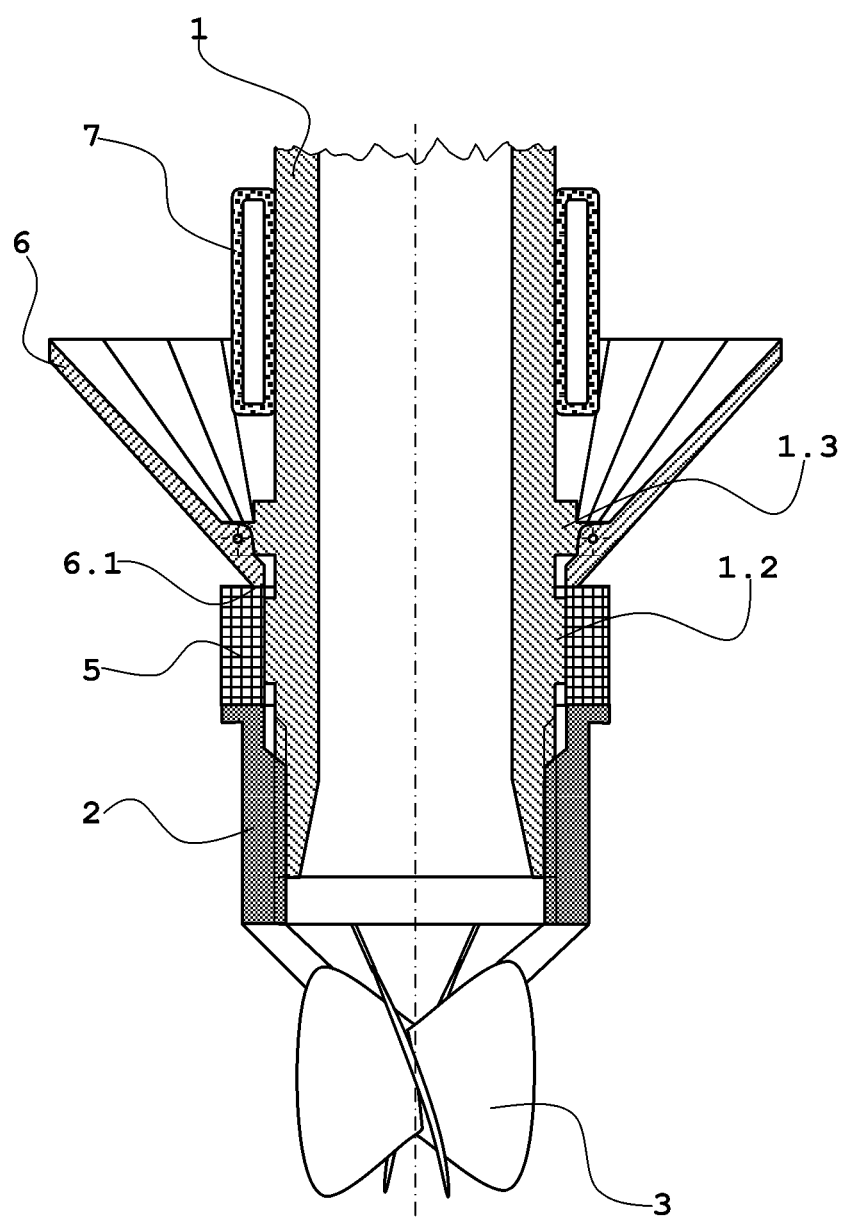
FIG. 2: shows a second exemplary device according to the invention in a vertical partial sectional view.

FIG. 2 shows an embodiment in which the rotor of the turbine 3 is rigidly connected to the nut body 2 so that its rotational speed equals the rotational speed of the nut body. In contrast to the embodiment of FIG. 1, this results in loss of the speed reduction and the resulting speed gain for moving the nut body but, on the other hand, helps to prevent dangerous cross-section constrictions at the entry into the inner tube 1.

Due to the cross section of the device according to the invention being smaller when being introduced into the tube to be sealed than for the subsequent sealing process and due to the energy for the first sealing process being derived from the flow of the fluid itself, the device according to the invention functions in an easy-to-use and robust manner.

The shown transmissions between the rotational movement of the rotor of the turbine 3 and the pivoting of the sealing bodies 6 are to be understood as advantageous, but however only exemplary embodiments of the invention.

The basic and general inventive idea is that the flowing fluid drives a turbine and that the mechanical energy that can be delivered by said turbine in form of rotational movement is used to move a sealing body from a position having reduced sealing capacity into a position having higher sealing capacity wherefore the mechanical energy from the turbine is transferred to the sealing body through a mechanical transmission.

Of course, within this basic and general inventive idea further embodiments are also possible and worthwhile:

Instead of many blade-like sealing bodies 6, for example, a ring-shaped sealing body could be used, the radial cross-sectional dimension of which is increased due to pressure through the spacer ring 5 or directly through nut part 2 so that sealing capacity is generated in the ring gap.

As another example, pivotable or radially movable sealing washers could be pivoted through the tooth flanks or a ring provided with external teeth or radially moved outwards with the ring being driven to rotate immediately by the rotational movement of the turbine or through a gear.

Due to the infinite variety of mechanical transmissions through which the movement of a turbine can be translated into the movement of a sealing body and due to the fact that a person skilled in the art of mechanical transmissions, given the task that a predetermined driving part (turbine) shall move one or more predetermined parts to be driven (sealing bodies), is certainly able to create one or more suitable mechanical transmissions, it is here not necessary to explain further embodiments beyond the mentioned examples.

The solutions for such mechanical transmissions disclosed in this description are thus to be understood as illustrative examples only, the main purpose of which is to illustrate the task—which in itself can be solved within the scope of the ordinary creative activities of a person skilled in the art—of creating a mechanical transmission.

For practical reasons the movement of one or more sealing bodies to be driven by the turbine will preferably be such movement through which the sealing bodies are spread radially away from the inner tube, as with other embodiments it is difficult close to impossible to introduce the inner tube together with the sealing bodies arranged on it into the tube to be sealed.

The invention claimed is:

1. A device for sealing the end face of a tube, the device comprising:
    an inner tube which has a smaller diameter than the tube to be sealed and is introduced at the end face into the tube to be sealed;
    a sealing body which is provided to seal a ring gap between the inner tube and the tube to be sealed, the sealing body being arranged in a movable manner on the inner tube;
    a turbine configured to be driven by a fluid flow from the tube; and
    a mechanical transmission, connected in between the turbine and the sealing body, the mechanical transmission acting to translate rotational movement of the turbine from the fluid flow into a movement of the sealing body, thereby bringing the sealing body from a position having reduced sealing capacity into a position having higher sealing capacity.

2. A device according to claim 1, characterized in that the movement of the sealing body is such through which the sealing body is spread radially away from the inner tube.

3. A device according to claim 1 wherein the mechanical transmission from the turbine to the sealing body comprises the driven rotational movement of a threaded nut and the axial movement of a part of the sealing body.

4. A device according to claim 3 wherein the rotational movement of the threaded nut is driven through a planet gear.

5. A device according to claim 3 wherein the threaded nut is rigidly connected to the rotor of the turbine.

6. A device according to claim 3 wherein the sealing body is concentrically arranged around a shell of the inner tube and its radial cross-sectional dimension can be increased through axial pressure and that axial pressure on the sealing body can be generated through axial movement of the threaded nut.

7. A device according to claim 1 wherein the mechanical transmission from the rotor of the turbine to the sealing body comprises a planetary gear wherein a sun wheel is driven through the rotor of the turbine.

8. A device according to claim 1 wherein the sealing body has a blade-like design and a plurality of similar sealing bodies are each pivotable around a bearing fixed at the inner tube.

9. A device according to claim 1 wherein the turbine defines a proximal end coupled to the inner tube and a distal end, the turbine is configured to be driven by a fluid flow in a direction from the distal end toward the proximal end.

10. A device according to claim 1 wherein the turbine is configured to be driven by the fluid flow from the tube, the fluid flow being in an upward direction.

11. A device for sealing the end face of a tube from which fluid flows, wherein the device comprises an inner tube which has a smaller diameter than the tube to be sealed and is introduced at the end face into the tube to be sealed, and further a sealing body which is provided to seal a ring gap between the inner tube and the tube to be sealed, characterized in that
    a turbine is arranged in the area of the end face of the inner tube, which can be driven by the flowing fluid, that the sealing body is arranged in a movable manner at the inner tube and that the device comprises a mechanical transmission which translates rotational movement of a rotor of the turbine following flowing fluid into a movement of the sealing body, thus bringing the sealing body from a position having reduced sealing capacity into a position having higher sealing capacity 1, characterized in that the mechanical transmission from the rotor of the turbine to the sealing body comprises the driven rotational movement of a threaded nut and the axial movement of a part of the sealing body.

12. A device according to claim 11, characterized in that the rotational movement of the threaded nut is driven through a planet gear.

13. A device according to claim 12, characterized in that the sealing body has a blade-like design and that a plurality of similar sealing bodies are each pivotable around a bearing fixed at the inner tube.

14. A device according to claim 12, characterized in that the sealing body is concentrically arranged around a shell of the inner tube and its radial cross-sectional dimension can be increased through axial pressure and that axial pressure on the sealing body can be generated through axial movement of the threaded nut.

15. A device according to claim 11, characterized in that the threaded nut is rigidly connected to the rotor of the turbine.

16. A device for sealing the end face of a tube from which fluid flows, wherein the device comprises an inner tube which has a smaller diameter than the tube to be sealed and is introduced at the end face into the tube to be sealed, and further a sealing body which is provided to seal a ring gap between the inner tube and the tube to be sealed, characterized in that a turbine is arranged in the area of the end face of the inner tube, which can be driven by the flowing fluid, that the sealing body is arranged in a movable manner at the inner tube and that the device comprises a mechanical transmission which translates rotational movement of a rotor of the turbine following flowing fluid into a movement of the sealing body, thus bringing the sealing body from a position having reduced sealing capacity into a position having higher sealing capacity, characterized in that the mechanical transmission from the rotor of the turbine to the sealing body comprises a planetary gear wherein a sun wheel is driven through the rotor of the turbine.

* * * * *